(12) United States Patent
Potter et al.

(10) Patent No.: US 6,860,398 B2
(45) Date of Patent: Mar. 1, 2005

(54) LOW PERMEATION FITTINGS, LOW PERMEATION CONTAINERS UTILIZING SAME, AND METHODS FOR FORMING SAME

(75) Inventors: James Fuller Potter, Livonia, MI (US); Duane Allen Fish, Fenton, MI (US); Erich James Vorenkamp, Pinckney, MI (US); John E. Thorn, Sylvania, OH (US); Link E. Vaughn, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 52 days.

(21) Appl. No.: 10/053,154

(22) Filed: Nov. 9, 2001

(65) Prior Publication Data

US 2002/0063129 A1 May 30, 2002

Related U.S. Application Data

(60) Provisional application No. 60/250,278, filed on Nov. 30, 2000.

(51) Int. Cl.$^7$ .............................................. B65D 88/00
(52) U.S. Cl. .................................. 220/567.2; 220/4.14
(58) Field of Search ........................... 220/567.2, 4.14, 220/562

(56) References Cited

U.S. PATENT DOCUMENTS

| | | |
|---|---|---|
| 3,115,987 A | 12/1963 | Barnstead |
| 3,426,937 A | 2/1969 | Boschi et al. |
| 3,606,958 A | 9/1971 | Coffman |
| 3,779,420 A | 12/1973 | Knaus |
| 3,811,173 A | 5/1974 | Baumann |
| 3,912,107 A | 10/1975 | Baumann |
| 4,513,906 A | 4/1985 | Chang et al. |
| 4,753,368 A | 6/1988 | Lescaut |
| 4,962,862 A | 10/1990 | Farrington et al. |
| 5,129,544 A | 7/1992 | Jacobson et al. |
| 5,230,935 A | 7/1993 | Delimoy et al. |
| 5,443,874 A | 8/1995 | Tachi et al. |
| 5,547,096 A | 8/1996 | Kleyn |
| 5,582,729 A | 12/1996 | Shioda et al. |
| 5,691,016 A | 11/1997 | Hobbs |
| 5,766,713 A | 6/1998 | Ravishankar et al. |
| 6,033,749 A | 3/2000 | Hata et al. |
| 6,044,999 A | 4/2000 | Kido |
| 6,179,145 B1 | 1/2001 | Roth |
| 6,189,716 B1 | 2/2001 | Lawrukovich et al. |
| 2001/0025666 A1 | 10/2001 | Brown et al. |
| 2001/0029994 A1 | 10/2001 | Brown et al. |

FOREIGN PATENT DOCUMENTS

| | | |
|---|---|---|
| EP | 0 448 329 A1 | 3/1991 |
| EP | 0 930 190 A2 | 7/1999 |
| EP | 0 930 190 A3 | 3/2000 |
| EP | 1 031 725 A2 | 8/2000 |
| EP | 1 031 725 A3 | 5/2001 |
| EP | 1 108 598 A2 | 6/2001 |
| EP | 1 108 599 A2 | 6/2001 |
| WO | WO 01/42692 A2 | 6/2001 |

Primary Examiner—Joseph Man-Fu Moy
(74) Attorney, Agent, or Firm—Brinks Hofer Gilson & Lione

(57) ABSTRACT

Low permeation fittings and low permeation plastic containers using same are constructed by molding an outer component into the wall of a plastic container while it is being formed. This causes the opening of a passageway in the outer component to be covered with wall forming material. The inner component is then inserted into the outer component through the wall forming material thereby trapping the wall material between the internal and external components. The barrier layer of the container wall is therefore continuous from the container to inside the fitting. A new fuel container, fuel neck fitting, and flange for mounting components on a fuel tank are disclosed.

8 Claims, 6 Drawing Sheets

| 1 - POLYETHYLENE |
| --- |
| 2 - REGRIND |
| 3 - ADHESIVE |
| 4 - ETHYL VINYL ALCOHOL (EVOH) |
| 5 - ADHESIVE |
| 6 - POLYETHYLENE | de# LOW PERMEATION FITTINGS, LOW PERMEATION CONTAINERS UTILIZING SAME, AND METHODS FOR FORMING SAME

This application claims priority of U.S. provisional patent application Ser. No. 60/250,278, filed Nov. 30, 2000.

FIELD OF THE INVENTION

This invention relates generally to the field of low permeability containers, such as those used in vehicle fuel tanks, and in particular is directed to improved low permeability containers with low permeability fittings.

DESCRIPTION OF THE RELATED ART

Plastic storage containers provide a number of advantages over those made of other materials, such as reduced weight, reduced costs for both materials and construction, and greater flexibility in shape. Along with these advantages, the ability of certain plastic containers to stretch or flex makes them useful in automotive applications, as they are less likely to leak in an accident. Mono-layer polyethylene fuel tanks, while benefiting from the aforementioned advantages, suffer from a comparatively high permeability to gasoline with respect to containers formed of other materials, and cannot meet U.S. Environmental Protection Agency (EPA) and state evaporative emissions standards. For example, both the EPA and the California Air Resources Board (CARB) are requiring progressively tighter evaporative emissions standards. Along with Zero Emission Vehicle (ZEV) and Low Emission Vehicle (LEV) standards, on-board refueling vapor recovery standards must be met. By reducing evaporative emissions from fuel tank systems, vehicle manufacturers can earn partial credit towards meeting ZEV standards.

Therefore several approaches have been taken to improve the permeability characteristics of plastic fuel containers. One solution to this problem has been a fuel tank formed of a multi-layer wall material that is composed of layers of polyethylene and an ethylene-vinyl alcohol co-polymer (EVOH). The ethylene-vinyl alcohol co-polymer exhibits good gasoline vapor barrier properties.

Polyethylene-EVOH thermoplastic structures can be formed into a variety of container shapes using twin-sheet thermo-forming and blow molding techniques. Polyethylene-EVOH container walls typically have 5 to 7 layers. The basic 5 layers include polyethylene inner and outer layers and one EVOH layer with an adhesive layer on each side. An optional sixth layer is typically a "regrind" layer made up of a mixture of polyethylene, ethylene vinyl alcohol (EVOH), and adhesive ground up from multi-layer materials left over from other manufacturing processes. An optional seventh layer may be a conductive layer or a material contact layer. For example, a multi-layer wall material having excellent gasoline vapor barrier properties is illustrated in FIG. 1. An outer layer 1 formed of polyethylene, overlays a regrind layer 2. Adhesive layer 3 binds regrind layer 2 to a central barrier layer 4 formed of EVOH, which in turn is bound by adhesive layer 5 to inner layer 6 of polyethylene.

Containers constructed using such multi-layer materials have low permeability to hydrocarbon or other vapors contained therein. Other technologies, such as platelet additives in the polyethylene, can also be used to create a lower permeation wall structure. However, the low permeation characteristics of the resulting containers are compromised when fittings are connected to the containers. This can be more clearly illustrated by reference to a typical fuel tank.

A Typical Fuel Tank

With reference to FIG. 2, a typical fuel tank is illustrated. The tank 10 has a common wall 12 that is penetrated by a fill spud 14 and a sender apparatus 16. In order to install spud 14 and apparatus 16, it is necessary to cut through the wall 12 so that these fittings can penetrate the container. The resultant openings and the fittings increase permeation values for the total container assembly.

With reference to FIG. 3, the components of a sender apparatus are illustrated. Fuel delivery module 13 can be attached to the large opening 15 in the fuel tank wall by a fitting comprising an encapsulated ring 17, a seal 18, and locking ring 19. In order to attach the sender apparatus to the fuel tank, encapsulated ring 17 is bonded to the container wall about opening 15. Seal 18 is placed on the sealing surface of the container formed outside of opening 15. Delivery module 13 is then placed inside of encapsulated ring 17, and bound to encapsulated ring 17 and the container by locking ring 19.

Fitting Attachment Techniques

Prior art techniques for attaching a fitting to a plastic container include molding an opening into the product during the molding operation. This can be accomplished by forming the opening on the parting line of the mold by inserting a pin between the mold halves and material layers contained therein during the molding process. The opening in the container is dictated by the size and shape of the pin. This technique leads to a discontinuity in the barrier layer at the seam where the mold halves come together. The outer finish of the opening is typically not acceptable for the sealing of an attachment, and requires a post-machining process to create a smooth surface. Such a machining process also enlarges the gaps in the barrier material at the seam, further increasing permeation of the assembly. Since the opening in the container is determined by the size of the pin, if there is not enough container material, the diameter of the hole formed can be irregular. Further, in order to insert a fitting into the opening, the diameter of the inserted portion cannot be greater than the diameter of the opening. Thus, this method is limited since the opening for the fitting can only be on the parting line of the container, permeation is increased at the seam where the material comes together, and fitting portions to be inserted into the opening can only be as large as the opening.

In instances where the diameter of the portion of a fitting to be installed inside a container is greater than the diameter of an opening formed at the mold parting line, it is necessary to bore a hole into the molded container. The fitting can then be welded onto the surface of the container. This method suffers from the need to interrupt the barrier layer at the attachment-container interface. Further, the fitting attached to the container may have a permeation that is higher than the container barrier material. Even an over-molded welded-on fitting has a relatively large permeation path through the weld.

Further information on low permeability tanks and methods for forming same can be found in numerous patents, articles and books, such as but not limited to U.S. Pat. No. 6,189,716 to Lawrukovich et al., U.S. Pat. No. 6,033,749 to Hata et al., U.S. Pat. No. 5,766,713 to Ravi Shankar et al., U.S. Pat. No. 5,691,016 to Hobbs, U.S. Pat. No. 5,443,874 to Tachi et al., and U.S. Pat. No. 5,230,935 to Delimoy et al., all of which are incorporated by reference as if reproduced in full herein.

There remains a need for low permeation fittings for use with low permeation containers, and for low permeation containers that meet the demands for flexibility in component placement and low cost without sacrificing strength and fuel economy benefits. There is also a need for simple methods for forming such containers.

BRIEF SUMMARY OF THE INVENTION

In one embodiment, the present invention provides a low permeability fitting for a low permeability container. The fitting has a hollow inner component and a hollow outer component between which can be sandwiched a low permeability material that forms the wall of a low permeability container.

An embodiment of a low permeation container forming method in accordance with the present invention includes incorporation of a low permeation fitting, such as that described above, into a container wall. One end of the outer component of the fitting is bonded to the container wall during formation of the container so that it is integral therewith. When the outer component is bonded to the container wall during formation of the container, the container end of a passageway in the outer component is blocked by container wall material. Thereafter, the inner component of the fitting is inserted into the outer component, thereby forcing the parent wall material up into the outer component. This results in a tight seal between the inner component and the outer component, with the container wall acting as a seal. As the container wall portion contained within the fitting is continuous with the container wall forming the rest of the container, the fitting continues the low permeation characteristics of the container wall outward from the main container.

In an embodiment, a new fuel tank inlet or fill spud fitting is disclosed, and in another embodiment, a fuel tank sender attachment fitting is disclosed.

It is to be understood that both the preceding summary and the detailed description that follows are intended merely to be exemplary and to explain further the invention claimed. The invention may be better understood by reference to the following detailed description read in conjunction with the accompanying drawings.

DETAILED DESCRIPTION OF THE INVENTION

Figure 4:
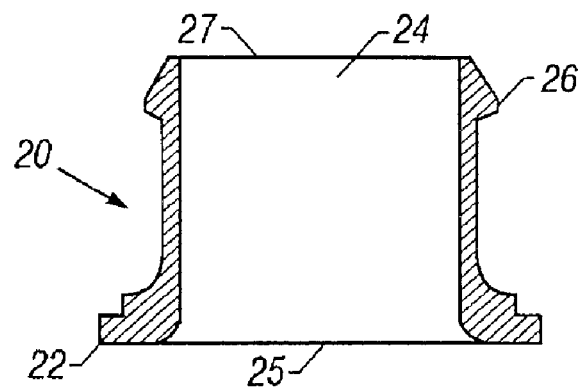
FIG. 4 is a cross-sectional, side-elevation view of the outer component of a fitting of the present invention.
Figure 5:
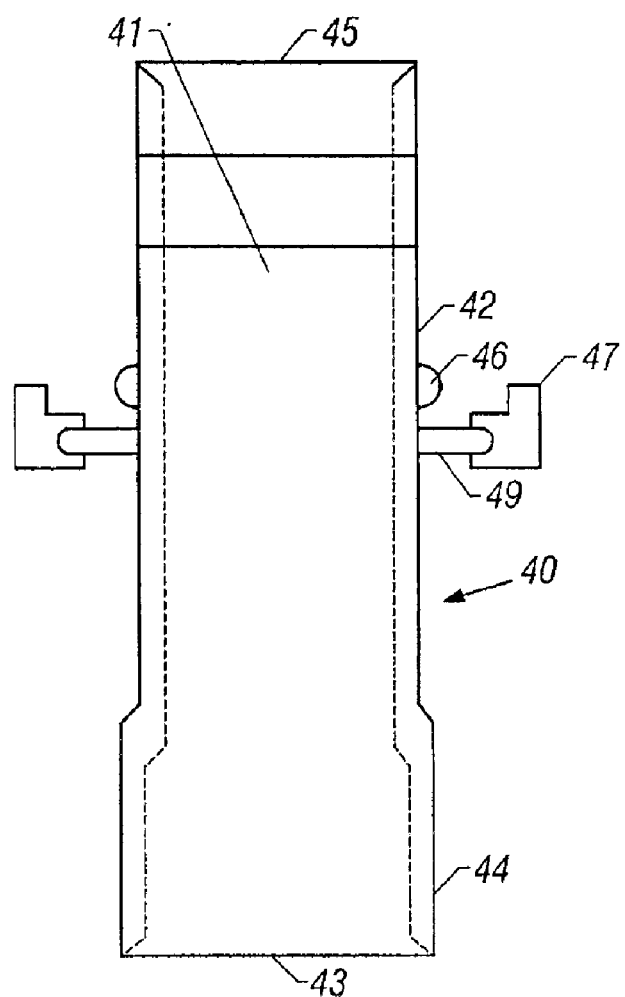
FIG. 5 is a cross-sectional, side-elevation view of an inner component of a fitting of the present invention.

An embodiment of the present invention may be better understood with reference to FIGS. 4 and 5. In FIG. 4, an outer component 20 for a fitting of the present invention is illustrated, while a matching inner component 40 is illustrated in FIG. 5. Outer component 20 is generally cylindrically shaped, and includes flange 22 at its lower or first end. Flange 22 is designed for molding into the outer wall of a low permeability plastic container during thermoplastic formation thereof. A cylindrically shaped first passageway 24 begins at inner opening 25 and terminates at outer opening 27.

Projections 26 on the outer end of outer component 20 are designed to provide a grip for a hose fitting that can be placed thereover. Alternatively, the component may have a smooth-walled exterior, or the exterior may have threads or other type of connector device thereon.

Referring again to FIG. 5, inner component 40 has a generally cylindrical shape with an upper cylindrical portion 42 continuing into a lower cylindrical portion 44 of greater diameter. A passageway 41 begins at inner opening 43 and ends at outer opening 45. Projections 46 on the exterior of upper cylindrical portion 42 are designed to assist in gripping parent wall material and assisting with its even distribution and extension up into the interior of outer component 20, and also serve to lock the inner component and wall material tightly together. An optional over-molded polyethylene ring 47 may be molded onto flange 49 of the inner component 40 instead of or in addition to projections 46 to assist in bonding the fitting to polyethylene container walls.

Low Permeation Fill Spud

Using FIGS. 4 and 5 as non-limiting examples, a fill spud fitting for a vehicle fuel tank in accordance with the present invention may be constructed. In an embodiment, outer component 20 has an inner diameter of 34 mm, and the outer diameter of the upper cylindrical portion 42 of inner component 40 is 31 mm. The length of passageway 24 through outer component 20 is 34.5 mm. For the purposes of this non-limiting example, sufficient parent material must be present to create a cylindrical extension of the container wall that would have a height of 34.5 mm, an inner diameter of 31 mm and a wall thickness of 3 mm. When inner component 40 is fully inserted into outer component, the greater the gap between the outer wall of the upper cylindrical portion of the inner component of the fitting and the inner wall of the outer component, the greater the amount of parent wall material required.

Figure 6:
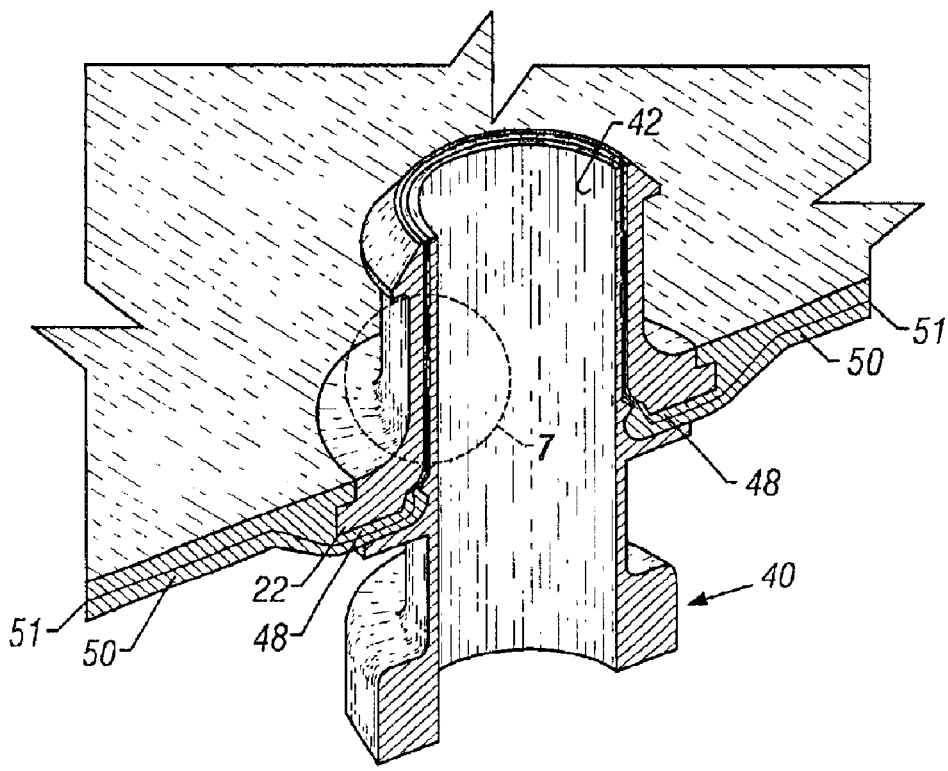
FIG. 6 is a cross-sectional, perspective view of a fitting of the present invention formed into the wall of a container of the present invention.
Figure 7:
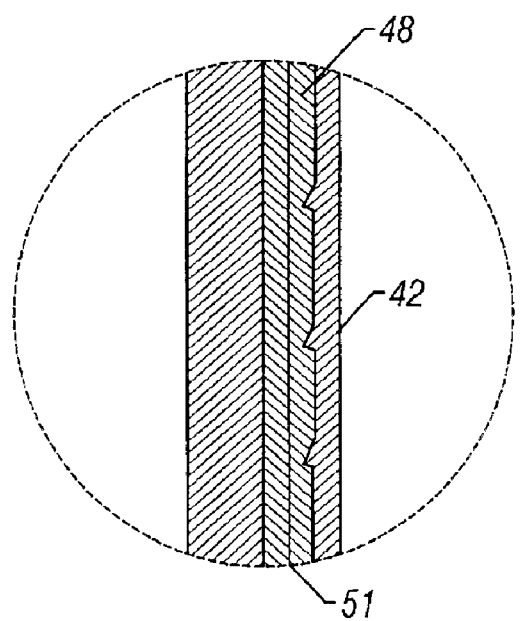
FIG. 7 is an expanded view of the portion of FIG. 6 encircled by the dotted line 7 in FIG. 6.

With reference to FIGS. 6 and 7, the attachment of a fitting such as that illustrated in FIGS. 4 and 5 to the wall of a container is illustrated. Outer component 20 is shown with flange 22 molded into the wall 50 of a container. The upper cylindrical portion 42 of inner component 40 projects upwardly into passageway 24 of outer component 20 with a portion 48 of wall 50 compressed between outer component 20 and inner component 40. Note that the barrier layer 51 in the portion of wall material 48 apposed against and between the inner and outer fitting components is continuous with the container wall outside of the fitting.

Figure 8:
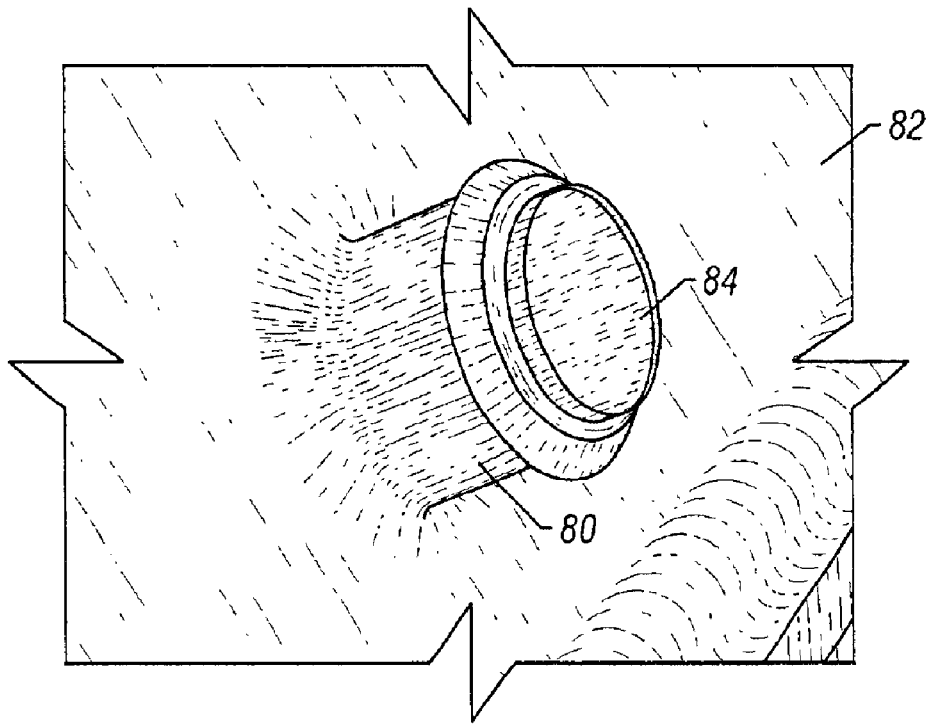
FIG. 8 is a perspective view of a portion of a low permeability container with a low permeability fitting installed in accordance with the present invention.

With reference to FIG. 8, an alternative embodiment of a fitting of the present invention is illustrated, in which the inner component of the fitting extends from inside of the container beyond the exterior end of the outer component of the fitting. The outer component 80 can be seen integrally molded or bonded to the external wall 82. The cylindrical sleeve 84 of the inner component can be seen projecting outwardly from outer component 80. In a preferred embodiment, container wall 82 is formed by twin sheet thermoforming of a thermoplastic material. For example, the thermoplastic material may be multi-layered, with a barrier layer of ethylene-vinyl alcohol copolymer (EVOH) adhered via adhesive layers to surrounding layers of polyethylene, such as that illustrated in FIG. 1.

Exemplary Fitting Component Materials

For an automobile gas tank fill spud, the fitting outer component, such at that shown in FIG. 4, can be formed of high-density polyethylene. High-density polyethylene (HDPE) bonds well to polyethylene wall-forming materials. High-density polyethylene fittings also provide good mechanical retention of connecting parts. However, as HDPE suffers from high permeability to hydrocarbons, in a preferred embodiment, the fitting inner component, such as that shown in FIG. 5, may be formed of an acetal or other material having low permeability to hydrocarbons or to whatever else is stored in the container.

High density polyethylene is widely available from numerous commercial sources, such as Exxon, Mobil, Solvay, Phillips, BASF, FINA, etc. Acetal materials are widely available from numerous commercial sources, such as DuPont, Ticona, etc.

An Examplary Low Permeation Fuel Tank

In an embodiment, a fitting such as that illustrated in FIGS. 4–5 may be attached to a low permeation container to form a low permeation vehicle fuel tank. The inner component may be an acetal barb, which may house a valve, such as a check valve. The inner component may have an overall length ranging from about 30 mm to about 300 mm, for example 100 mm, and have an upper cylindrical portion with an outer wall diameter of about 31 mm, for example, and a projection or projections appropriately placed to assist in pushing parent wall material into the outer component. The acetal barb may also include an inner tank portion that is continuous with the portion that extends through the outer component of the fitting, but which has a wider diameter, such as the inner component 40 illustrated in FIG. 5. For example, in a non-limiting embodiment, the inner cylindrical portion of the inner fitting component has an outer diameter of about 35.25 mm and forms approximately 26 mm of the 100 mm length of the inner component of the fitting.

The matching outer component has a height of about 34.5 mm, an inner diameter of 34 mm, and an outer wall diameter of about 42 mm. The outer wall has an integral connecting flange with a diameter of about 54 mm and a thickness of about 5.5 mm, and a barb on its outer end with a maximum diameter of about 44.5 mm.

Figures 1, 2:
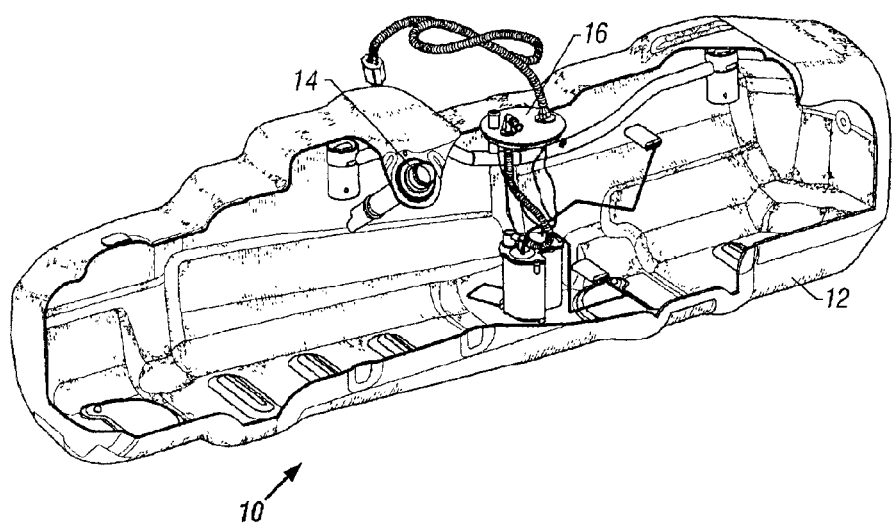
FIG. 1 is a cross sectional view of an exemplary multi-layer material with low permeability to gasoline vapors.
FIG. 2 is an illustration of a typical fuel tank.
Figure 3:
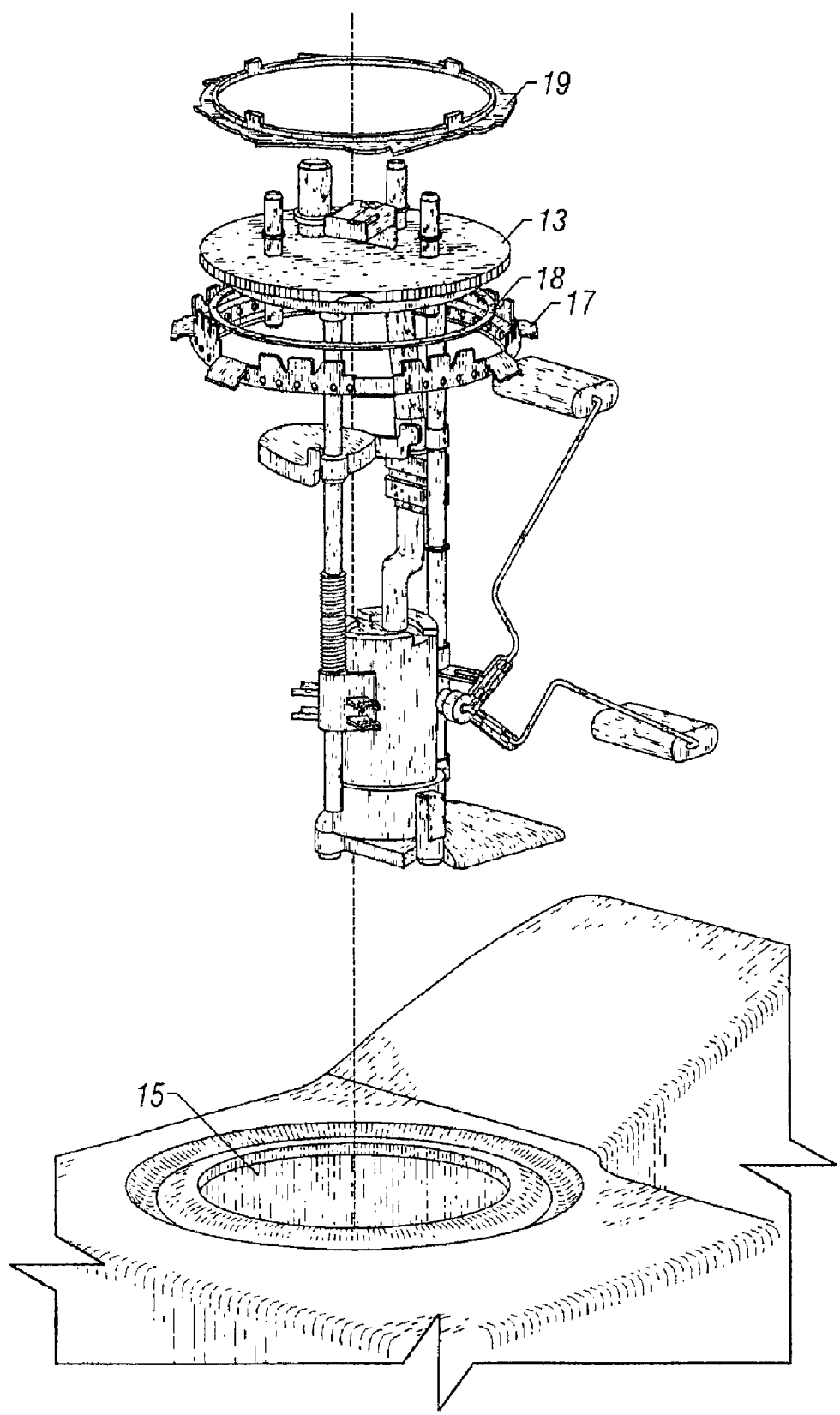
FIG. 3 is an exploded view of a typical fuel tank sender unit and a partial view of a fuel tank in which it is installed.

The container is thermoformed from a multi-layer material, such as that illustrated in FIG. 1, with a portion of the material apposed to and between the inner and outer components of the fill spud fitting.

Parent Material

The depth of the fitting into which the container wall is to be extended by the inner component dictates the amount of the parent material required, as does the gap between the inner and outer fitting part. Generally, for automotive fuel tanks, a parent material thickness for use in a twin sheet thermoforming process will range from about 1 mm to about 7 mm, preferably 3 mm to 6 mm for an embodiment, and preferably will be about 4.5 mm for another embodiment. These dimensions will vary depending upon the demands of the fitting.

An exemplary multi-layer thermoplastic container forming material may have an outer layer and inner layer of fuel tank grade HDPE that can be obtained from commercial sources such as Exxon, Mobil, Solvay, Phillips, BASF, FINA, Equistar, and Baysell. The adhesive layers may be formed of linear low-density polyethylene with maleic anhydride, such as that commercial available from Mitsui and Equistar. Ethylene vinyl alcohol for the barrier layer is commercially available from Evalca and Soarus. Other suppliers may have or develop adequate substitute materials. The container wall forming materials can be extruded as a multi-layer sheet that is cut to desired width and length for forming a container.

Method for Forming a Low Permeation Container

An exemplary container forming process in accordance with the present invention may proceed as follows. The external or outer component of a fitting, such as that illustrated in FIG. 4, is placed into a mold. The component has a flange, such as flange 22, or other connecting mechanism that is aligned with the wall of the container to be formed while the barb or external part projects towards the outside of the mold. During the molding process, such as a thermoforming process, the wall of the container is drawn into the outer component of the fitting. The molding process results in the container wall extending across the opening of the passageway, such as passageway 24, in the outer component, and preferably extends into the passageway.

Preferably, while the thermoplastic wall material is still at a sufficient temperature to have the requisite flow characteristics, an inner component, such as that illustrated in FIG. 5, can be used as a "push pipe" to extend the container wall material up into the outer component of the fitting. Projections on the exterior of the inner component help force the wall material up into the outer component and to evenly distribute the wall material. Thus, the projections help to maintain a good tight seal and fit between the inner component, outer component, and the container wall sandwiched between the components.

Once the inner component is inserted into the outer component to the desired degree, the wall material blocking the passageway through the center of the inner component and outer component can be cut. The passageway can be opened either in-mold, or as a post molding trimming operation. Alternatively, a cutting element can be provided that automatically cuts the excess wall container from the fitting upon insertion of the inner component into the outer component to the desired depth. In some instances, the internal component can be used for internal attachment or alignment. Since the external diameter of the fitting can be the external diameter of the outer component, and the outer component can be preformed, the need for post-machining in many instances may be eliminated.

In a conventional twin sheet thermoforming process, sheets of multilayer thermoplastic material are loaded into thermoformers at loading station(s), and the loaded sheets then transferred into an oven for heating.

In an embodiment of a twin sheet forming process of the present invention, the outer component of a fitting, such as that illustrated in FIG. 4 is placed into a first thermoforming mold half. A complementary or second mold half may be simultaneously loaded. Once the sheets have reached the proper molding temperature of about 360° F. to about 430° F., the hot thermoplastic sheets are then transferred to the molds in a molding station, and the sheets drawn into each mold half by vacuum. During this process the sheet in the first mold half is drawn against and preferably partially into the passageway of the fitting outer component. As the sheet is being drawn against and into the outer fitting component or soon thereafter, the inner component of the fitting, such as that illustrated in FIG. 5 is pushed inside the outer component passageway. This traps the container wall with its barrier material in between the inner and outer components. The portion of the fitting that projects from the container wall comprises three concentric cylinders that are formed by the outer component wall, the container wall, and the inner component wall. The first and second molds are then closed to form a container.

Internal air pressure may be used to assist in forming and cooling the container. Once the container is cooled, it is removed from the mold pieces, excess flash is removed, and any secondary finishing operations are performed.

In a blow molding process, the outer fitting component would be placed into a mold when the mold is open and prior to insertion of a parison of molten plastic. The parison is preferably a hollow tube formed of a multi-layer material structure such as that described in FIG. 1. The fitting inner component is placed on an inserting mechanism that extends inside the parison from the top or the bottom. As the mold closes on the parison, the open ends of the parison are pinched shut. During "pre-blow" low pressure compressed air is introduced inside the parison to begin inflating it against the outer walls of the container. This can be done as the mold is being closed and before the ends of the parison are sealed, or the sealed parison can be pierced by an inflation needle in the mold. Once the mold is closed, high pressure air is introduced via one or more inflation needles to inflate and cool the container. The fitting inner component can be inserted into the fitting outer component either during the pre-blow, or soon after the high pressure air is utilized. The fitting inner component must be present inside of the parison when it is inserted into the mold for blow molding. Once the container is cooled, it is removed from the mold, excess flash removed, and the container is finished.

Fittings for use with the present invention include by way of non-limiting examples fill spuds, attachment mounts (e.g., flange mounts), check valves, fill limit valves, and roll over valves.

Flange Mount

Figure 9:
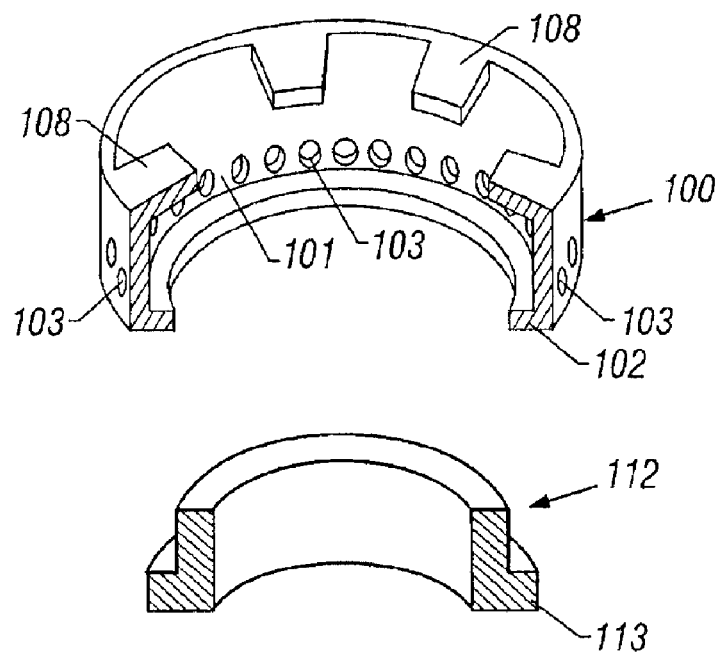
FIG. 9 is a partial cross-sectional perspective view of the inner and outer components of flange mount fitting.
Figure 10:
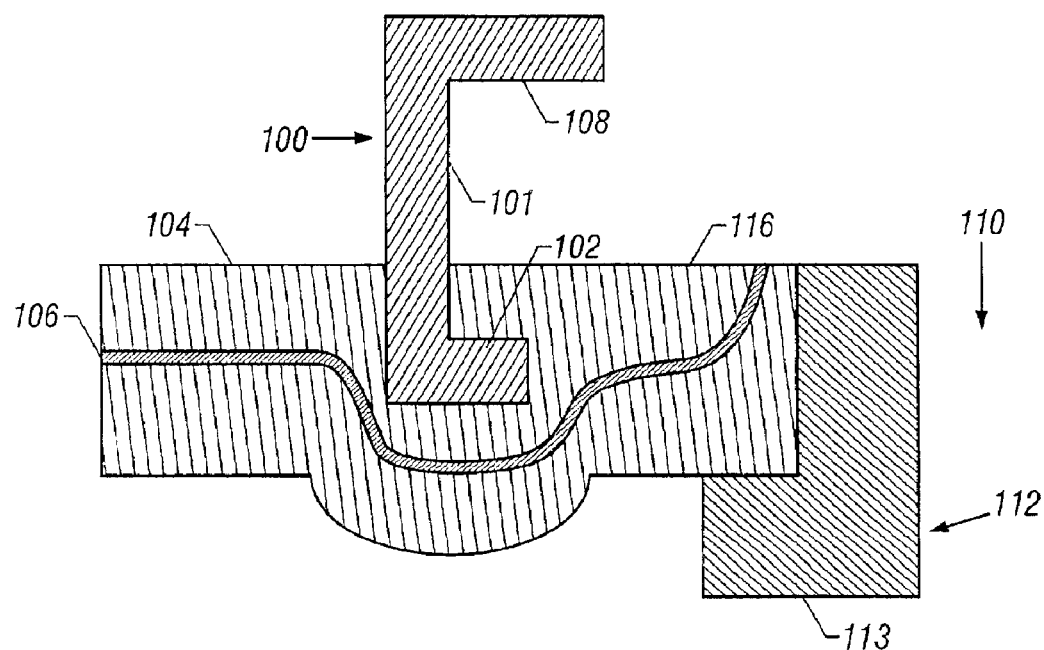
FIG. 10 is a partial cross-sectional view of the fitting of FIG. 9 formed into the wall of a low permeability container.

With reference to FIGS. 9 and 10, a flange mount fitting and installation are illustrated. FIG. 9 illustrates a cross sectional perspective view of the fitting inner and outer components, and FIG. 10 is a partial cross sectional view of the flange mount installed in the wall of a container. A component, such as a vehicle fuel tank sender unit, can be connected to the fitting bonded to a container. The outer component 100 is generally in the shape of a ring with an annular lower or encapsulated flange 102 that can be formed into a wall, such as wall 104 in FIG. 10. Wall 104 may include a barrier layer 106 or may be formed of another low permeability material. Outer component 100 may be made of metal, or of a sufficiently rigid plastic to accommodate the needs of the component to be attached thereto, e.g. a fuel delivery module or other sender apparatus. Component attachment flanges 108 are shown projecting inwardly. However, these flanges are optional, and may be eliminated or have other configurations depending upon the component to be attached to the outer component.

Outer component 100 includes a vertical wall 101, which forms a cylinder. A plurality of openings 103 are placed in wall 101 to permit molten thermoplastic material to flow therethrough during molding of the part to a thermoplastic material.

Inner component 112 is a ring with annular flange 113. Inner component 112 made be made of metal, but preferably is made of a plastic that will bond well to the wall of a container. The plastic may be a low permeability plastic coated with a thin layer of polyethylene to enhance bonding to a thermoplastic polyethylene wall material. In an embodiment, inner component 112 can be formed of metal, and have a plastic coating.

FIG. 10 illustrates in cross-section the attachment of the fitting illustrated in FIG. 9 to a container wall. Outer component 100 is placed in a mold so that inner flange 102 is bonded into or encapsulated by thermoplastic wall material 104 during the molding process. The thermoplastic wall material may be polyethylene, and is preferably a multi-layer material such as that illustrated in FIG. 1, and hence FIG. 10 includes a barrier layer 106. Thermoplastic material may pass through openings 103 in vertical wall 101 to enhance bonding of the part to the wall. Thereafter, inner component 112 is inserted to the desired depth into the center of outer component 100, and excess wall material 104 is then cut away. In the embodiment illustrated in FIG. 10, the components 110 and 112 are installed about an opening 110. The shape of opening 110 may be circular as outer component 100 and inner component 112 are annular in shape. However, other shapes are possible, depending on the shape of the fitting components.

The fitting produces a large sealing surface 116, which in a preferred embodiment is sufficiently large that an attached device overlaps the barrier layer 106 and the entire opening 110 surrounded by the fitting inner component 112.

The fitting rings may optionally be formed of metal, for example mild steel with a coating for corrosion protection or perhaps stainless steel.

Containers constructed in accordance with the present invention have numerous advantages in addition to low permeability. For example, since plastic fuel containers can alter their shape due to temperature, the fuel or other chemicals stored therein, and/or under physical stresses, use of the fittings of the present invention reduce the likelihood of a fitting leaking at the junction of the fitting with the container wall. Further, unlike prior containers, the diameter of the internal components of a fitting can be much larger than the opening in the container. Further, the inner fitting component can be made of a material less susceptible to swell and deformation so that the opening inside of the container can be used for calibration purposes and to accurately direct placement of other components inside the container. The fittings of the present invention and methods for forming same into a container require less parent container material thickness to form a robust attachment due to the strength created by the sandwich structure.

Even containers that do not require low permeation characteristics will benefit from the advantages made possible by the present invention, such as improved structural integrity. For example, containers for storage of nonvolatile fluids may be constructed in accordance with the present invention by using a parent wall material that would be permeable to volatile fluid vapors. For example, polyethylene without a hydrocarbon barrier layer may be used.

The improved containers of the present invention are useful in all modes of self-propelled vehicles, such as but not limited cars, buses, marine and recreational vehicles, and trucks, and may also be useful in other applications, such as mobile or stationary storage containers for fuel and other volatile liquids.

While new low permeability fittings, low permeability containers, and methods of forming same have been disclosed as examples, there could be a wide range of changes without departing from the present invention. Thus, it is intended that the foregoing detailed description be regarded as illustrative rather than limiting and that it be understood that it is the following claims, including all equivalents, which are intended to define the scope of the invention.

What is claimed is:

1. A container assembly, comprising a fitting and a wall, said wall defining a container with an interior and an exterior surface, said wall having a fitting portion in said fitting and a container portion forming said container beyond said fitting, and said fitting comprising an inner component and an outer component, said outer component being bonded at a first end to said wall and having an outer portion that extends outwardly from said exterior surface of said container, at least a portion of said inner component being situated inside of said outer portion of said outer component, wherein said fitting portion of said wall is apposed to said inner component and to said outer component in said outer portion of said outer component, wherein said fitting portion of said wall is continuous with said container portion.

2. The assembly of claim 1, wherein said container wall comprises a layer impermeable to hydrocarbons.

3. The assembly of claim 1, wherein said container is a fuel tank for a vehicle, and said fitting is selected from the group consisting of a fuel inlet fitting, a vapor control valve fitting, and a sender unit attachment fitting.

4. The assembly of claim 1, wherein said outer component comprises high density polyethylene, and said inner component comprises an acetal.

5. The assembly of claim 1, wherein said container wall comprises a layer of ethylene vinyl alcohol copolymer.

6. The assembly of claim 1, wherein said container wall comprises an inner layer of ethylene vinyl copolymer and at least one outer layer of high density polyethylene.

7. The assembly of claim 6, wherein said fitting portion of said wall has an average thickness of between about 1 mm to about 8 mm.

8. The assembly of claim 4, wherein said container wall comprises a layer of ethylene vinyl alcohol copolymer.

* * * * *